(12) United States Patent
Kang

(10) Patent No.: US 11,216,121 B2
(45) Date of Patent: Jan. 4, 2022

(54) SMART TOUCH PAD DEVICE

(71) Applicant: Tae Ho Kang, Seongnam-si (KR)

(72) Inventor: Tae Ho Kang, Seongnam-si (KR)

(*) Notice: Subject to any disclaimer, the term of this patent is extended or adjusted under 35 U.S.C. 154(b) by 41 days.

(21) Appl. No.: 16/540,478

(22) Filed: Aug. 14, 2019

(65) Prior Publication Data
US 2020/0057518 A1 Feb. 20, 2020

(30) Foreign Application Priority Data
Aug. 14, 2018 (KR) .................... 10-2018-0094940

(51) Int. Cl.
*G06F 3/041* (2006.01)
*G06F 3/044* (2006.01)
(52) U.S. Cl.
CPC ............ *G06F 3/044* (2013.01); *G06F 3/0412* (2013.01); *G06F 3/0416* (2013.01)
(58) Field of Classification Search
None
See application file for complete search history.

(56) References Cited

U.S. PATENT DOCUMENTS

| 7,889,177 | B2* | 2/2011 | Dutton | ............... G06F 1/1694 345/157 |
|---|---|---|---|---|
| 2007/0202914 | A1* | 8/2007 | Maaloe | ............... H04M 1/233 455/550.1 |
| 2016/0062634 | A1* | 3/2016 | Kurita | ............... G06K 9/00402 715/268 |
| 2016/0103985 | A1* | 4/2016 | Shim | ............... A61B 5/02427 726/19 |
| 2016/0291768 | A1* | 10/2016 | Cho | ............... G06F 1/163 |

* cited by examiner

*Primary Examiner* — Brian M Butcher
(74) *Attorney, Agent, or Firm* — Novick, Kim & Lee, PLLC; Jae Youn Kim; Jihun Kim

(57) ABSTRACT

A smart touch pad device includes: a main body unit; a touch pad unit that is disposed on the main body unit to recognize a touch signal and a motion signal generated by contact of a user; a mouse unit that recognizes an operation signal generated by movement of the main body unit; a controller that extracts movement information from a touch signal or an operation signal or extract motion information that can perform a predetermined function from a touch signal; and a transceiver unit that transmits/receives movement information and motion information to/from a computer or a mobile communication device.

18 Claims, 15 Drawing Sheets

SMART TOUCH PAD DEVICE

BACKGROUND OF THE INVENTION

Field of the Invention

The present invention relates to a smart touch pad interface method and an apparatus thereof and, more particularly, to a smart touch pad interface method that can support a touch pad function and a mouse function as a pointing device, and can perform a remote control function on a touch pad on the basis of a touch gesture, and an apparatus thereof.

Description of the Related Art

In general, a mouse, which is an input device for executing programs in computers, can move a pointer (cursor) on a monitor by moving or can execute programs related to icons on which a pointer is positioned when a mouse button is pushed.

Notebooks generally use a touch pad integrally installed with the notebooks as an input device due to the demand of downsizing. A touch pad can generate a movement of a pointer (cursor) on a monitor by converting a touch by a finger into electrical signals. Similar to a mouse, a touch pad has a touch button enabling execution of programs related to icons.

However, a mouse can be conveniently used in general work of clicking icons on a monitor, but is lower in touch sensitivity than a touch pad. Accordingly, a mouse may be inconvenient in work of drawing pictures or writing characters on a monitor. Further, using a mouse for a long period of time may cause diseases such as carpal tunnel syndrome and requires a predetermined space for up-down and left-right movements.

On the other hand, a touch pad has high touch sensitivity, so it may be suitable for work of drawing pictures or writing characters, but the width thereof is limited and the position is fixed, so it may be inconvenient to use for general pointing.

Further, specific remote controllers are used to control devices, respectively, in order to control IoT devices that are being continuously increased, but it is accompanied by inconvenience due to problems such as an increase in number of remote controller, storage and management, and inconvenience in moving. Accordingly, there is an increasing need for an integrated device and a consistent user interface for efficiently controlling IoT devices that keep increasing.

Accordingly, there is a need for a technology that implements the function of a mouse and the function of a touch pad through one device, thereby being able to enable selective use of one of the two functions, if necessary, or to provide convenience in inputting by providing a new function through combination of the two functions, and to enable a remote controller execution function to be conveniently performed on a touch pad on the basis of touch gestures.

SUMMARY OF THE INVENTION

An object of the present invention is to provide a smart touch pad device that can implement an execution function on a touch pad on the basis of touch gestures.

Further, an object of the present invention is to provide a smart touch pad device that can use both of the function of a mouse and the function of a touch pad.

Further, an object of the present invention is to provide a smart touch pad device that can conveniently perform an input operation that cannot be performed individually by a mouse or a touch pad by combining and using the function of a mouse and the function of a touch pad. In more detail, an object is to provide a smart touch pad device that can simultaneously perform the pointing device function, which is basically provided by a mouse or a touch pad, and additional work (e.g., deleting a pixel in a picture and underlining a character) that is performed on the basis of coordinates calculated through pointing.

Further, an object of the present invention is to provide a smart touch pad device that provides a consistent user interface that can control various devices through one device.

Further, an object of the present invention is to provide a smart touch pad device that can replace various input devices (e.g., a mouse, a touch pad, a keypad, and a remote controller) with one device by using various sensing functions. Further, an object of the present invention is to provide a smart touch pad device that supports a function of informing a user of call reception, text reception, or an alarm by linking with a smartphone so that the user engaged in computer work can easily recognize it.

The objects to implement in the present invention are not limited to the technical problems described above and other objects that are not stated herein will be clearly understood by those skilled in the art from the following specifications.

In order to achieve the objects of the present invention, an embodiment of the present invention may provide a smart touch pad device including: a main body unit; a touch pad unit that is disposed on the main body unit to input a touch signal and a touch gesture signal generated by contact of a user; a mouse unit that recognizes an operation signal generated by movement of the main body unit; a controller that extracts position coordinates or movement information from the touch signal or the touch gesture signal, or determines a use mode by extracting and recognizing touch gesture information that can perform a predetermined function from the touch gesture signal; and a transceiver unit that transmits/receives the position coordinates, the movement information, and the touch gesture information to/from a control target device, a computer, or a mobile communication device.

In order to achieve the objects of the present invention, another embodiment of the present invention may provide a smart touch pad device including: a main body unit; a touch pad unit that recognizes a touch signal generated by contact in a state where one surface of the main body unit is exposed; a mouse unit that recognizes an operation signal generated by movement of the main body unit in a state where the main body unit is turned over and the other side of the main body unit is exposed, and includes a physical button or a virtual button that can perform a click or a double click; a controller that extracts movement data from the touch signal or the operation signal; and a transceiver unit that transmits/receives the movement data extracted by the controller to/from a computer or a mobile communication device.

DETAILED DESCRIPTION OF THE PREFERRED EMBODIMENTS

Figure 1:
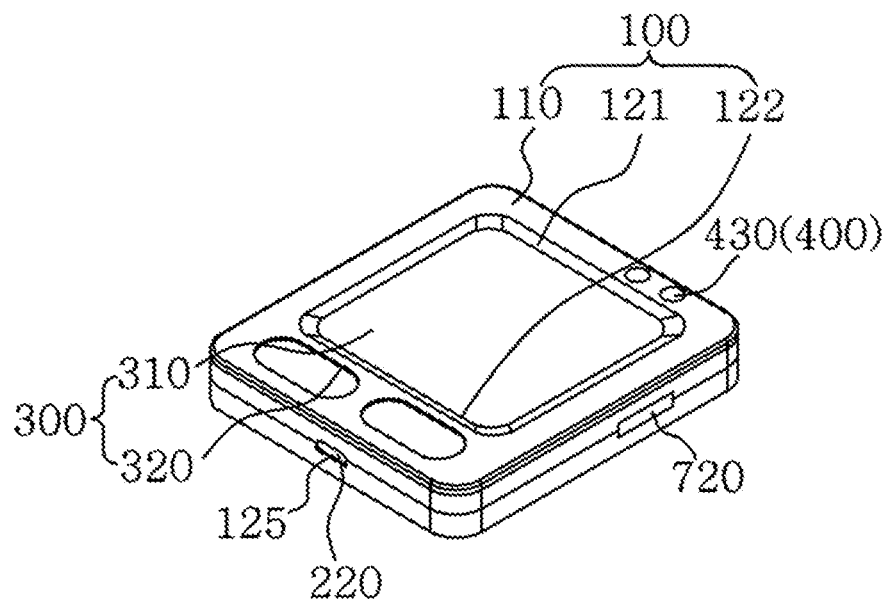
FIG. 1 is a perspective view showing a touch pad device according to a first embodiment of the present invention.

Hereinafter, the present invention is described with reference to the accompanying drawings. However, the present invention may be modified in various different ways and is not limited to the embodiments described herein. Further, in the accompanying drawings, components irrelevant to the description will be omitted in order to obviously describe the present invention, and similar reference numerals will be used to describe similar components throughout the specification.

Throughout the specification, when an element is referred to as being "connected with (coupled to, combined with, in contact with)" another element, it may be "directly connected" to the other element and may also be "indirectly connected" to the other element with another element intervening therebetween. Further, unless explicitly described otherwise, "comprising" any components will be understood to imply the inclusion of other components rather than the exclusion of any other components.

Terms used in the present invention are used only in order to describe specific exemplary embodiments rather than limiting the present invention. Singular forms are intended to include plural forms unless the context clearly indicates otherwise. It will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

Hereinafter, embodiments will be described in detail with reference to the accompanying drawings.

Figure 2:
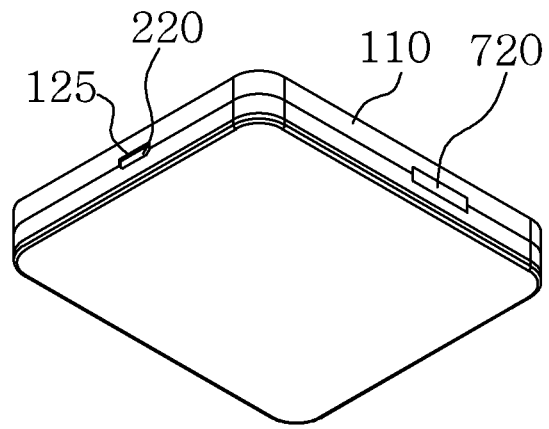
FIG. 2 is a perspective view showing the touch pad device that has been turned over in accordance with the first embodiment of the present invention.
Figure 3:
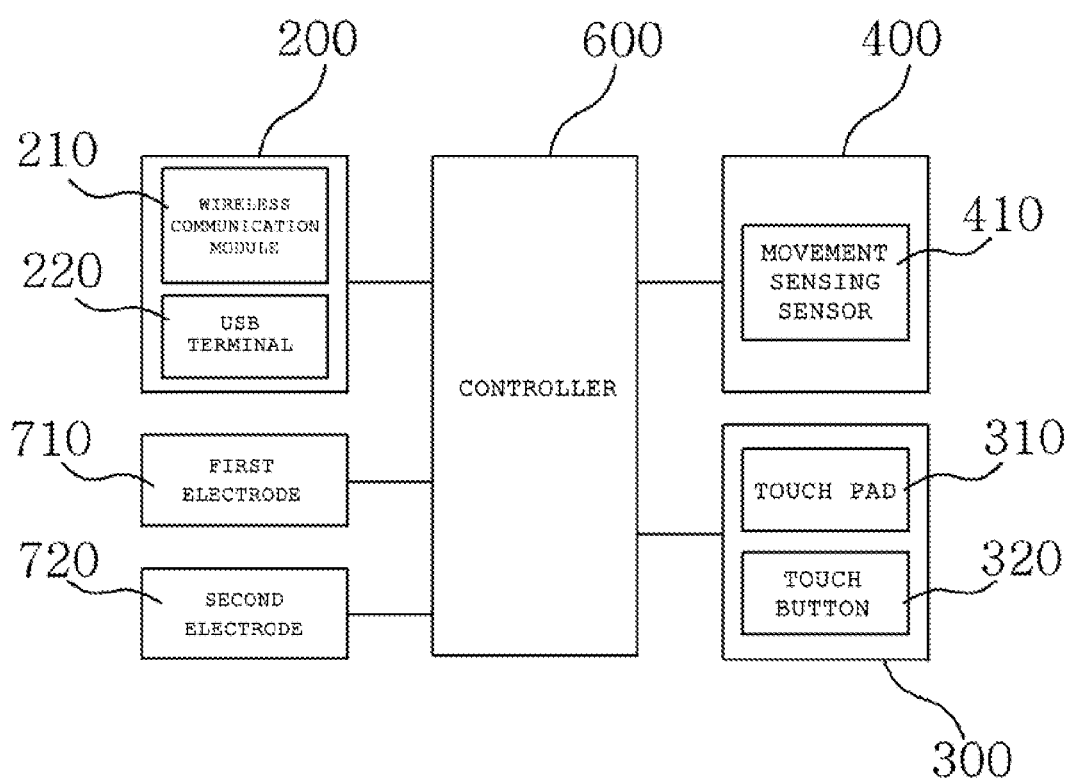
FIG. 3 is a block diagram showing the main configuration of the touch pad device according to the first embodiment of the present invention.
Figure 4:
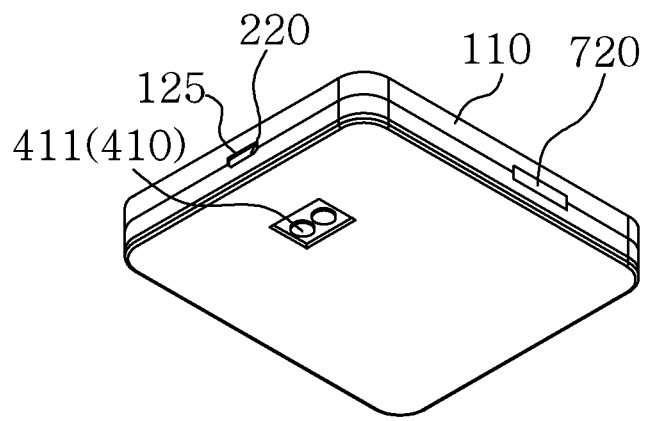
FIG. 4 is a perspective view showing the touch pad device that has been turned over in accordance with a modified example of the first embodiment of the present invention.

FIG. 1 is a perspective view of a touch pad device according to a first embodiment of the present invention, FIG. 2 is a perspective view showing the touch pad device that has been turned over in accordance with a first embodiment of the present invention, FIG. 3 is a block diagram showing the main configuration of the touch pad device according to the first embodiment of the present invention, and FIG. 4 is a perspective view showing the touch pad device that has been turned over in accordance with a modified example of the first embodiment of the present invention.

As shown in FIGS. 1 to 4, a touch pad device 10 according to a first embodiment of the present invention may include a main body unit 100, a transceiver unit 200, a touch pad unit 300, a mouse unit 400, and a controller 600.

In detail, the main body unit 100 may be provided in a housing shape that a user can hold by hand. In this embodiment, the main body unit 100 may be configured as a flat hexahedron-shaped case 110. However, the main body unit 100 is not limited thereto and, obviously, may be changed in various shapes that a user can conveniently hold by hand.

A pad groove 121 in which a touch pad 310 of the touch pad unit 300 is positioned and a pair of touch grooves 122 exposing a touch button 320 may be formed on one surface (e.g., the top surface) of the main body unit 100. Further, on one surface of the main body unit 100, a plurality of slip tabs 430 may be disposed and spaced apart from each other close to an edge of the main body unit 100.

A first electrode 710 and a second electrode 720 may be disposed on the left side surface and the right side surface (in FIG. 1) of the main body unit 100. Further, a terminal groove 125 in which a USB terminal 220 is installed may be formed on the bottom surface of the main body unit 100.

For example, when a user holds the main body unit 100 by hand in contact with a side of the main body unit 100, the first electrode 710 can measure the capacitance of the user being in contact with the side of the main body unit 100 and apply information about the measured capacitance to the controller 600. Further, when a user holds the main body unit 100 by hand in contact with the other side of the main body unit 100, the second electrode 720 can measure the capacitance of the user being in contact with the other side of the main body unit 100 and apply information about the measured capacitance to the controller 600. The two electrodes can be implemented in various smart touch pad devices in terms of position, shape, and material.

The touch pad unit 300 can recognize a touch signal generated by contact of a user and can transmit a recognized touch signal to the controller 600 when one surface (top surface) of the main body unit 100 is positioned upward. The touch signal can be understood as an electrical signal that is generated when a user touches the touch pad 310.

The touch pad unit 300 may include the touch pad 310 and a touch button 320. The touch pad 310 may be mounted on the main body unit 100 to be exposed on one surface of the main body unit 100. In more detail, the touch pad 310 may be positioned in the pad groove 121 of the main body unit 100.

The touch pad 310 can output a touch signal by sensing a touch by a finger or a touch pen. In this embodiment, although the touch pad 310 is implemented with an electrostatic touch pattern on one outer surface of a PCB, it is not limited thereto and various touch sensor elements may be used. For example, a resistive type touch sensor element may be applied to the touch pad.

The touch button 320 may be positioned on one surface of the main body unit 100, in more detail, in the touch grooves 122 of the main body unit 100. The touch button 320 can apply an execution signal recognized by a push of a user's finger to the controller 600. For example, when a user touches the touch pad 310, a pointer is generated on a monitor, and when the user pushes the touch button 320 with the pointer positioned on an icon on the monitor, the touch button 320 can execute a program (instruction) related to the icon through the controller 600.

The mouse unit 400 includes a movement sensing sensor 410 that senses an operation signal of the main body unit 100 when the main body unit 100 is moved.

The movement sensing sensor 410 can sense movement of the main body unit 100. The movement sensing sensor 410 may be configured as a 3D sensor (e.g., a gyroscope sensor) that is applied to air mouses. Obviously, the movement sensing sensor 410 may be configured as various sensors other than a 3D sensor.

As shown in FIG. 4, the sensor 410 may be configured as an optical sensor 411 that senses movement of the main body unit 100 by recognizing light reflected by a supporting surface. Alternatively, the sensor 410 may be configured as a laser sensor (not shown) that senses movement of the main body unit 100 by recognizing an infrared laser reflected by a supporting surface. Further, the movement sensing sensor 410 may be other various sensors as long as they have the function described above. For example, the movement sensing sensor 410 may be an ultrasonic sensor.

Accordingly, when the mouse unit 400 is activated and a pointer is generated on a monitor, and when a user clicks the touch button 320 of the touch pad unit 300 with the pointer positioned on an icon on the monitor, an execution signal recognized by a push of a user's finger can be applied to the controller 600. That is, the touch button functions as a mouse button. In this case, it is possible to use the smart touch pad device with the touch button facing up by turning the smart touch pad device 180 degrees in a plane for the convenience for a user. Accordingly, when the smart touch pad device is turned 180 degrees in a plane, it is possible to change from a mouse mode to a touch pad mode or from the touch pad mode to the mouse mode by recognizing the turning.

Further, the touch pad 310 of the touch pad unit 300 can function as a mouse button. That is, the touch pad unit 300 can recognize a touch by short contact by a user in correspondence to a click of the mouse button, so it can perform a virtual mouse button function for performing a mouse function such as a click and a double click. In this case, the touch button can perform other functions (e.g., a mode switch key or an ESC key). The controller 600 can perform a function that generally controls the operations of all components of the touch pad unit 300 and the mouse unit 400.

The controller 600 can receive a touch signal or an operation signal from the touch pad unit 300 or the mouse unit 400. The controller determines first whether it is a mouse mode, a touch pad mode, or a combination mode as a pointing device on the basis of the touch signal or the operation signal, secondarily determines whether it is another support mode except for the pointing device, for example, a remote control mode, a smartphone control mode, or a keypad mode, and then provides a suitable function fitted to each mode. When it is a pointing device mode, it is possible to extract movement information (a movement position, a movement distance, a movement direction, etc. of the pointer) on a monitor intended by a user. Thirdly, it is possible to extract action information or property information such as a button click in addition to extracting position information. Further, it is possible to provide the extracted information to a computer or a mobile communication device through the transceiver unit 200. The controller provides a remote control function that can control turning-on/off of a connected device when it is a remote control mode. Further, when it is a keypad mode, the controller provides a keypad function enabling input of various characters.

For example, when the touch pad mode is selected, the smart touch pad device can perform a pointing device function as a touch pad.

The pointing device mode, which is a mode providing a function that can input at least position coordinates using a smart touch pad device, is classified into a touch pad mode, a mouse mode, and a combination mode in which these two modes are used in a combination. The controller 600 can extract movement information (a movement position, a movement distance, a movement direction, etc.) intended on a monitor by user from a touch signal or an operation signal applied in the pointing device mode and can provide the extracted movement information to a computer or a mobile communication device through the transceiver unit 200.

For example, in a state where one surface of the main body unit 100 is exposed (see FIG. 1), when a user touches the touch pad 310 of the touch pad unit 300 with a finger or a touch pen, the controller 600 can activate the function of the touch pad unit 300 and generate a pointer on the monitor of a device connected in a wire or wireless type in accordance with a predetermined program (touch pad mode). Further, when the user moves the main body unit in a plane, the controller 600 can move the pointer on the monitor. When the user selects a specific icon on the monitor and pushes the touch button 320, the controller 600 can execute a program (instruction) related to the icon (mouse mode).

When a user touches short once (clicks) or continuously touches short twice (double clicks) the touch pad 310 in the mouse mode supporting the mouse function, the controller 600 can control the touch pad device 10 to perform the same functions as click and double click functions of a mouse.

In the pointing device mode, the touch pad mode and the mouse mode can be automatically recognized.

For example, when only a touch by a user is recognized through the touch pad 310 without movement of the main body unit 100, the controller 600 recognizes that it is the touch pad mode, so the user can move a pointer on a monitor using the touch pad 310 of the touch pad unit 300.

When the main body unit 100 is moved horizontally in a plane without a touch by a user on the touch pad 310, the controller 600 recognizes that it is the mouse mode, so the user can move a pointer on a monitor in the same way as a mouse.

In order to reduce malfunction of the touch pad 310 having high touch sensitivity, the controller 600 analyzes a touch pattern input through the touch pad of the touch pad device. In this case, when a touch pattern to which a palm or a portion of a palm is projected, or a touch pattern that is not the type of a finger touch is input, the controller 600 can determine that a user holds the smart touch pad device by hand to use the device as a mouse. In this case, when the main body unit is moved, it is recognized as the mouse mode, and when there is no movement of the main body unit, the touch signal can be ignored.

As another method, the controller 600 may recognize a turn signal of the main body unit 100 and may be converted into the touch pad mode and the mouse mode. For example, when a user turns the device, that is, the main body unit 100 180 degrees in a plane so that it is upside down, the controller 600 can recognize it and can be automatically converted into the mouse mode or the touch pad mode.

On the other hand, though not shown, the touch pad device 10 according to the present embodiment may further include a notification unit that informs a user of occurrence of an event using one or more of a lamp, a display, and vibration when one or more events of an alarm of an external mobile communication device, call reception, text reception, and SNS message reception occur, by linking with the mobile communication device.

[Combination Mode]

When meaningful input is applied simultaneously to the touch pad and a movement sensing unit, it is possible to provide a combination mode function that may perform another predetermined function. In the present embodiment, when a user touches the touch pad 310 and moves the main body unit 100 horizontally in a plane, the controller 600 can perform specific input functions, depending on the number of points on the touch pad 310 that the user touches.

For example, when a user touches the touch pad 310 on one point and moves the main body unit 100 horizontally in a plane, the controller 600 can control the touch pad device to perform an eraser function that erases a drawn picture along the movement path of the pointer on the monitor.

Further, when a user touches the touch pad 310 on two points and moves the main body unit 100 horizontally in a plane, the controller 600 can control the touch pad device to perform an underlining function that underlines characters written on a movement path of the pointer on the monitor along the movement path.

Further, when a user touches the touch pad 310 on three points and moves the main body unit 100 horizontally in a plane, the controller 600 can control the touch pad device to perform a copy on characters written on a movement path of the pointer on the monitor along the movement path.

The controller 600 may perform predetermined different functions, depending on the touch area or the touch position by a user on the touch pad 310. For example, when the touch pad 310 is divided into nine equal parts and a user moves a finger or a touch pen touching on the upper right area of the touch pad 310, the controller 600 may function of a CAP/SMA switch function that changes English letters from lower case into upper case or a KOR/CHN switch function that changes Korean into Chinese letters.

[Hold Recognition Electrode]

A plurality of electrodes may be installed on a side and the other side or at various positions depending on design in order to accurately grasp the hold for using a mouse function. In this case, it is possible to selectively switch the touch pad function of the touch pad device and the mouse function of the touch pad device in accordance with measured capacitance.

For example, a first electrode 710 and a second electrode 720 may be disposed on a side and the other side of the main body unit 100. In this configuration, the positions, shapes, and materials of the two electrodes may be implemented in various ways in accordance with the design of the smart touch pad device. For example, the two electrodes may be both disposed on the front surface. When a user holds the main body unit 100, it is possible to measure capacitance of the user being in contact between the first electrode 710 and the second electrode 720, and it is possible to apply information about the measured capacitance to the controller 600.

For example, when capacitance of a user is measured, the controller 600 considers that the user is holding both sides of the main body unit 100, and then when the main body unit 100 is moved horizontally in a plane, the controller 600 recognizes it as a mouse mode of the touch pad device. Accordingly, the user can move the pointer on the monitor by using the main body unit 100 as a mouse.

On the other hand, even if a user lifts the smart touch pad device in the air from a flat surface such as a desk, holds the smart touch pad device with a hand, and performs input with the other hand using the touch pad, capacitance between the two electrodes is measured. In this case, the purpose to use the touch pad function is clear and as the user holds the rear side, there is little possibility that a wrong touch signal is input to the touch pad by a palm, etc. In this case, since the mouse function is not used, the mouse function should be inactivated and the touch function should be activated. Hold is confirmed by measuring capacitance at two electrodes to discriminate the modes. When a touch pattern on the touch pad is the type of touch using fingers and when the smart touch pad device is not inclined, moved, or horizontally moved as the result of sensing using an acceleration sensor or a gyro sensor, it is recognized as the touch mode in which a user holds the device with a hand and inputs a touch signal with the other hand.

The modes can be set and selected in various ways, and are not limited to the mode described above.

[Mouse Wheel Function Support]

The mouse wheel function can be implemented in two methods. First, when a user holds the device (i.e., capacitance is measured), touches a touch pad surface with a finger, and moves in a direction to scroll, it is recognized as a scroll wheel function. In this case, the scroll speed may depend on the touch movement speed.

Further, the scroll function may depend on the number and positions of touched fingers. For example, when it a multi-touch using two fingers, it may mean moving one page at a time. Alternatively, when a finger is moved upward from the upper end of the touch pad, it is possible to move to the first or the uppermost position. In the same way, it is possible to move to the uppermost, the lowermost, the left, and the right ends by moving a touch in each direction from up, down, left, and right positions of the touch pad.

For example, as described above, the first electrode 710 and the second electrode 720 may be disposed on a side and the other side of the main body unit 100, and when a user holds the main body unit 100, capacitance of the user being in contact can be sensed between the first electrode 710 and the second electrode 720. When a touch scroll operation on the touch pad unit is sensed with a user holding the device, that is, capacitance sensed between the first electrode 710 and the second electrode 720, as described above, it can be recognized as a scroll wheel function. Another method of implementing the wheel function is a method of inclining the smart touch pad device in the pointing device mode. The scroll function can be implemented in the inclined direction. Further, when the device is inclined up, down, left, and right with the touch pad touched or the touch button pressed to more clearly show the scroll direction, it can be controlled to support the scroll function. In this case, it is possible to adjust the scroll speed in accordance with the inclined angle.

[Mode Witch]

In particular, the controller 600 can extract a touch gesture that can perform a predetermined function from a touch signal that is applied from the touch pad unit 300. In other words, when a user touches and then immediately takes off the finger, a point is formed, and when the user moves a finger on the touch pad 310, a line or a loop (closed curve) is formed on the touch pad 310, so the controller 600 can extract touch information corresponding to the point, line, and loop from corresponding touch signals. When such touch information is continuously input, it is possible to create commands based on a touch gesture that can perform predetermined functions by analyzing their phase relationship. The smart touch pad device can feely switch and use the pointing device mode, the remote control mode, or the keypad mode using the touch gesture commands. The mouse mode, the touch pad mode, and the combination mode in the pointing device mode are already described, so the descriptions thereof are omitted. Further, the touch gesture commands may be used as commands for controlling a target device in the remote control mode.

FIG. 5 is a status view showing a process of extracting touch gesture information from a touch signal and changing a mode in the touch pad device according to the first embodiment of the present invention, and FIG. 6 is a status view showing an embodiment of extracting touch gesture information in the remote control mode and turning on/off a control target device in the touch pad device according to the first embodiment of the present invention.

For example, as shown in FIG. 5, upon receiving a touch signal forming a cross point by continuous input of at least two touch lines from the touch pad unit 300, the controller 600 can change into a standby mode that can perform a predetermined function. Further, in a state where the mode is changed to standby mode, upon receiving a touch signals of clicks M1, M2, M3, and M4, a double click M5, or long press (not shown) in regions divided by two continuously input touch lines from the touch pad unit 300, the controller 600 can extract a touch gesture command that executes an instruction in accordance with a predetermined function.

Figure 5A:
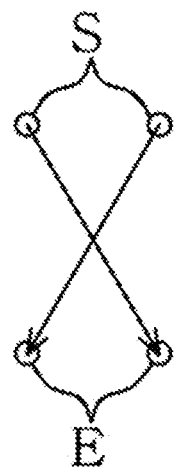
FIGS. 5(a) and 5(b) are status views showing a process of extracting motion information from a touch signal in the touch pad device according to the first embodiment of the present invention.
Figure 5B:
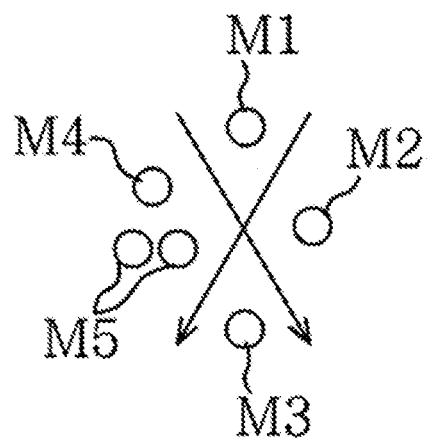

For example, as shown in FIG. 5a, when receiving a touch signal forming an x-shape by two crossing touch lines from the touch pad unit 300, the controller 600 can change into the standby mode. Further, as shown in FIG. 5b, in a state where the mode is changed to standby mode, when receiving a touch signal of a double click M5 in any one of four regions divided by touch lines from the touch pad unit 300, the controller 600 converts the smart touch pad device 10 into the remote control mode that performs a remote control function.

Further, in a state where the mode is changed to standby mode, when a touch signal of a click in any one of four regions divided by the two touch lines is applied from the touch pad unit, the mode is changed into a touch pad mode, a mouse mode, a keypad mode, or a combination mode in which the touch pad mode and the mouse mode can be used in combination and then a function according to the touch pad mode, mouse mode, keypad mode, or combination mode set in advance can be performed.

In order to prevent unexpectedly inputting 'x' and then changing modes while using in the daily environment, the mode change method based on a touch gesture is used together with another input, thereby being able to reduce errors. For example, when the mode change based on a touch gesture is input with the touch pad device erected at 90 degrees, or when the mode change instruction based on a touch gesture is input with a button pressed, or when the mode change command based on a touch gesture is input with a specific point touched, the mode may be changed accordingly, thereby removing a mode change error during daily use.

Further, for mode change, it is possible to change into the pointing device mode and the remote control mode in a toggle type by simultaneously long-pressing two touch buttons.

Further, an instruction to perform a mode change or system setup can be allocated by a simultaneous touch with three fingers. In a state where three fingers are touched, it is possible to set the pointing device mode by pressing the left button and it is possible to set the remote control mode by pressing the right button. Alternatively, it is possible to set a specific mode depending on movement directions, by moving up, down, left, and right with three fingers touched.

[Remote Control Mode and Function]

Thereafter, in order to perform a remote control function such as tuning on/off the power or changing volume/channel with the smart touch pad device 10 changed into the remote control mode, as shown in FIG. 6, it is possible to create a control instruction using a touch gesture and perform a control function by extracting and recognizing touch gesture information.

Figure 6A:
FIGS. 6(a), 6(b) and 6(c) are status views showing an embodiment of extracting motion information for a remote control mode in the touch pad device according to the first embodiment of the present invention.
Figure 6B:
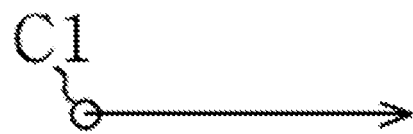

As shown in FIG. 6, as an embodiment of a touch gesture for controlling a target device in the remote control mode, it is possible to perform a control instruction based on a touch gesture on the basis of the relationship of a touch point that is input after one touch line is input. For example, it may be an information for performing an instruction for turning on the power of a target device by a touch signal C1 of FIG. 6b that inputs one touch line such as a touch signal of FIG. 6a and then clicks, double clicks, or long-presses the start point S of the touch line. The command based on a touch gesture may be information for performing not only an instruction to turn on the power, but also an instruction for decreasing volume or channel.

Figure 6C:

Alternatively, it may be an information for performing an instruction for turning off the power of a target device by a touch signal C2 of FIG. 6c that inputs one touch line such as a touch signal of FIG. 6a and then clicks, double clicks, or long-presses the end point E of the touch line. The command based on a touch gesture may be information for performing not only an instruction to turn off the power, but also an instruction for increasing volume or channel.

Although a method of using one touch line and touch points as a touch gesture command for controlling a target device in a remote control mode was described in the present embodiment, the present invention is not limited thereto and it is also possible to use various types of touch lines, touch points, and touch closed loops in order to perform various control instructions in the remote control mode.

FIG. 7 is a status view showing another embodiment of performing a control instruction using touch gestures of a closed loop and a point in the remote control mode in the touch pad device according to a first embodiment of the present invention, and FIG. 8 is a status view showing yet another embodiment of controlling a target device using a touch gesture combination of a closed loop and a line in the remote control mode in the touch pad device according to the first embodiment of the present invention.

For example, as shown in FIGS. 7 to 8, another embodiment of extracting touch gesture information for the remote control mode is described as follows.

Figure 7A:
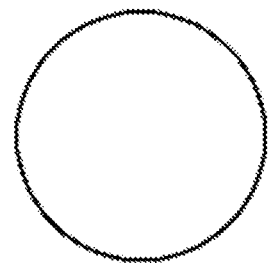
FIGS. 7(a), 7(b) and 7(c) are status views showing another embodiment of extracting motion information for a remote control mode in the touch pad device according to the first embodiment of the present invention.
Figure 7B:
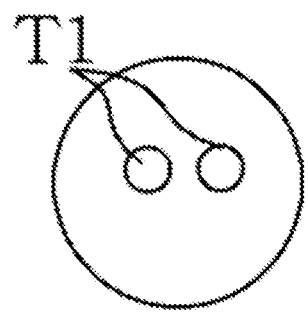

As shown in FIG. 7, touch gesture information for the remote control mode may be information for performing an instruction to turn on the power of a target device that is controlled by the remote control mode in response to a touch signal of FIG. 7a that forms a closed loop (e.g., in an o-shape) with one touch line and a touch signal T1 of FIG. 7b that clicks, double clicks, or long-presses the inside of the closed loop of the touch line. The touch gesture instruction may be used as a command that decreases or increases volume or a channel depending on the number of times of clicking and the time of long-pressing.

Figure 7C:
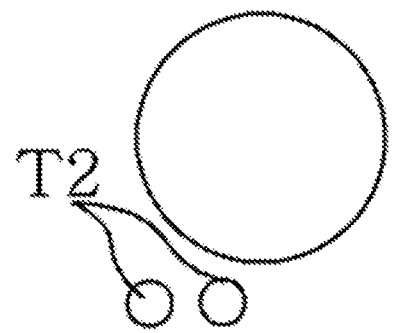

Further, touch gesture information for the remote control mode may be information for performing an instruction to turn off the power of a target device in response to a touch signal of FIG. 7a that forms a closed loop (e.g., in an o-shape) with one touch line and a touch signal T2 of FIG. 7c that clicks, double clicks, or long-presses the outside of the closed loop of the touch line. The touch gesture instruction may be used as a command that decreases or increases volume or a channel depending on the number of times of clicking and the time of long pressing.

Figure 8A:
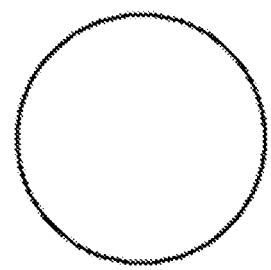
FIGS. 8(a), 8(b) and 8(c) are status views showing yet another embodiment of extracting motion information for a remote control mode in the touch pad device according to the first embodiment of the present invention.
Figure 8B:
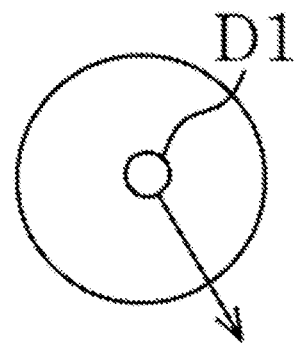

As shown in FIG. 8, touch gesture information may be information for performing an instruction to turn on the power of a target device that is controlled by the remote control mode in response to a touch signal of FIG. 8a that forms a closed loop (e.g., in an o-shape) with one touch line and a touch signal D1 of FIG. 8b that is dragged from the inside of the closed loop to the outside of the closed loop of the touch line.

Figure 8C:
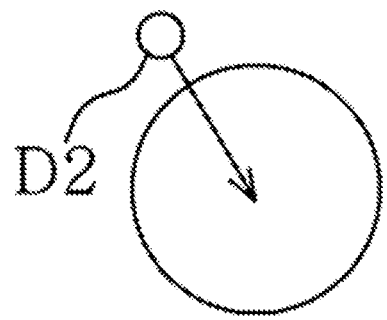

Further, touch gesture information may be information for performing an instruction to turn off the power of a target device in response to a touch signal of FIG. 8a that forms a closed loop (e.g., in an o-shape) with one touch line and a touch signal D2 of FIG. 8c that is dragged inside the closed loop from the outside of the closed loop of the touch line.

The line stated above includes all of a curved line, a straight line, and a bent straight line having a plurality of bending points, and the closed loop may also include all of an ellipse, a circle, a triangle, a rectangle, and a polygon.

Although various method for an instruction to control a target device were designed to be fitted to predetermined touch gestures (e.g., "line-line", "line-point", and "closed loop-line" types) in FIGS. 5 to 8 of the present embodiments, the present invention is not limited thereto. Further, the execution instructions can support various functions such as the function of adjusting volume and channel in addition to turning on/off power.

The transceiver unit 200 can receive movement information from the controller 600 and transmit the movement information to a mobile communication device, and can receive data from a mobile communication device and transmit the data to the controller 600.

To this end, the transceiver unit 200 may include a wireless communication module 210 that can transmit/receive information to/from a mobile communication device in a wireless type. The wireless communication module 210 can transmit/receive information to/from a mobile communication device such as a smart TV, a computer, or a notebook in a wireless type.

Further, the wireless communication module 210 can lock/unlock screen of a smartphone, and perform specific techniques and move data in the smartphone by linking with the smartphone. Further, the wireless communication module 210 can also lock and unlock a door lock by linking with the door lock. For example, the method of turning on/off power of the remote control functions described above can be changed into a function that locks or unlocks a lock when the control target is limited to a door lock.

The transceiver unit 200 may include a USB terminal 220 that can transmit/receive information to/from a mobile communication device in a wire type. The USB terminal 220 may be disposed in the terminal groove 125 of the main body unit 100 and can exchange information with a mobile communication device in a wire type through a transmission cable. The transmission cable connected to the USB terminal can be used as a passage for exchanging information between a smart touch pad device and a target device and can be used to charge a battery in the smart touch pad device at the same time.

Although the configuration of exchanging information with a mobile communication device through the wireless communication module 210 or the USB terminal 220 was described in the present embodiment, various kinds of communication modules other than the wireless communication module 210 or the USB terminal 220 may be used for the transceiver unit 200. For example, the transceiver unit 200 may include a communication module that supports a near field wireless communication type such as ultrasonic communication as well as Bluetooth.

Figure 9:
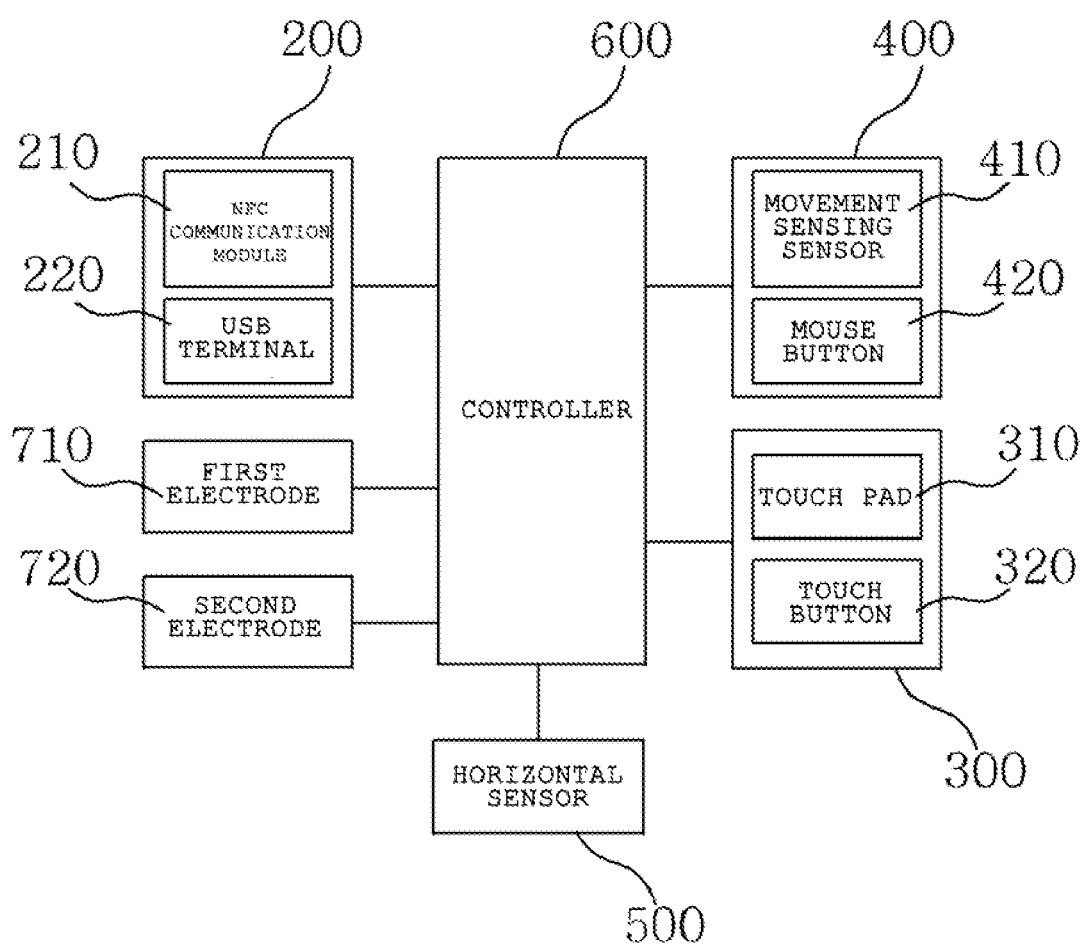
FIG. 9 is a block diagram showing the main configuration of a touch pad device according to a second embodiment of the present invention.

FIG. 9 is a block diagram showing the main configuration of a touch pad device according to a second embodiment of the present invention.

As shown in FIG. 9, a touch pad device according to a second embodiment of the present invention may include a main body unit 100, a transceiver unit 200, a touch pad unit 300, a mouse unit 400, a controller 600, and a horizontal sensor 500.

The touch pad device according to the second embodiment may be similar to or substantially the same as the configuration described in the first embodiment in other configuration except for the horizontal sensor 500, so the above description of components and operations may be omitted and similar reference numerals may be given to similar components.

The horizontal sensor 500 can sense the state when the main body unit 100 is moved horizontally with respect to the ground. The horizontal sensor 500 may be configured as a sensor different from the movement sensing sensor 410 stated in the first embodiment. For example, the horizontal sensor 500 may be configured as a slope sensor, an angle sensor, a GPS sensor, etc.

The controller 600 can receive sensing information about a horizontal movement state of the main body unit 100 from the horizontal sensor 500 and can determine whether to activate the mouse function of the touch pad device.

The controller 600 analyzes the sensing information received from the horizontal sensor 500, and then can activate the mouse function of the touch pad device when the main body unit 100 is in a state of moving horizontally and there is no touch on the touch pad 310 by a user. In other words, when the main body unit 100 is in a state of moving horizontally and there is no touch on the touch pad 310 by a user, the controller 600 can control the touch pad device 100 to provide an operation signal generated by movement of the main body unit 100 to the transceiver unit 200.

Further, the controller 600 analyzes the sensing information received from the horizontal sensor 500, and can activate the mouse function of the touch pad device when the main body unit 100 is in a state of moving horizontally and there is at least one or more points touched on the touch pad unit 300 by a user. In other words, when the main body unit 100 is in a state of moving horizontally and there is at least one or more points touched on the touch pad 300 by a user, the controller 600 can control the touch pad device 100 to provide an operation signal generated by movement of the main body unit 100 to the transceiver unit 200.

Figure 10A:
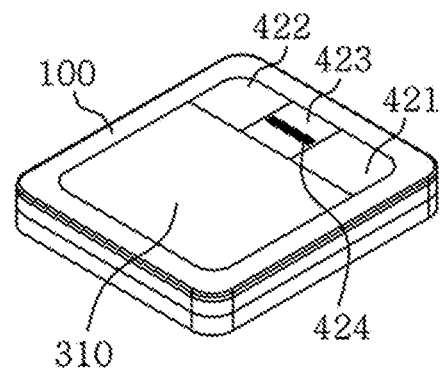
FIGS. 10(a) and 10(b) are perspective views showing a touch pad device according to a third embodiment of the present invention.
Figure 10B:
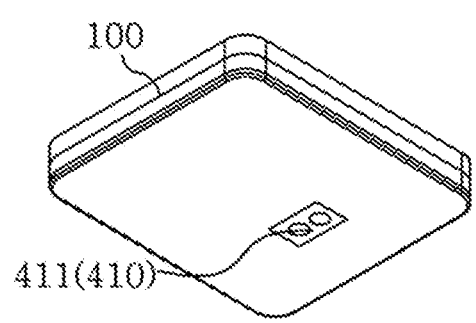

FIG. 10 is a perspective view showing a touch pad device according to a third embodiment of the present invention. Parts that are not shown in this figure are the components the same as or similar to those of the previous embodiments and repeated components and reference numerals are omitted. In FIG. 10, (a) shows the front surface of the touch pad device 10 and (b) shows the rear surface of the touch pad device 10.

A touch pad unit 300 may be disposed on the front surface of the touch pad device 10. The touch pad unit 300 may include a touch pad 310 that recognizes a touch signal generated by contact of a user.

A pair of mouse buttons 421 and 422 and a wheel button 423 may be disposed at an end of the touch pad 310. The pair of mouse buttons 421 and 422 may be disposed on one surface of the main body unit 100 such that an execution signal is input by a push of a user. The wheel button 423 is disposed between the pair of mouse buttons 421 and 422 and can sense a swipe by a user.

The pair of mouse buttons 421 and 422 can correspond to the left button and the right button of a mouse, respectively.

A step 424 may be formed at the center of the wheel button 423, so when a user swipes the step 424 up and down, it can be considered as a wheel function.

When the upper end of the step 421 is clicked, a page-up key [PgUP] function of moving up by one page is performed, and when it is double clicked, a home key [Home] function of moving to the first page is performed. Similarly, when the lower end of the step is clicked, a page-down key [PgDN] function of moving down by one page is performed, and when it is double clicked, an end key [End] function of moving to the last page is performed.

Further, the region of the pair of mouse buttons 421 and 422 and a wheel button 423 disposed at an end of the touch pad 310 can function as a control panel that controls the device. For example, when a swipe is applied from the left mouse button region to the right mouse button region, the device is converted into a device dedicated as a touch pad. In contrast, when a swipe is applied from the right mouse button region to the left mouse button region, the device can be defined to be used as only a mouse.

When the mouse mode is entered by a user shaking a mouse or coming in contact with an electrode in a horizontal state, the touch pad 310 can be deactivated. In the mouse mode, the mouse buttons 421 and 422 and the wheel button 423 on the front surface and the movement sensing sensor 420 on the rear surface are activated, so the touch pad device 10 can function as a mouse. In this configuration, the movement sensing sensor 410 may be an optical sensor 411.

Figure 11:
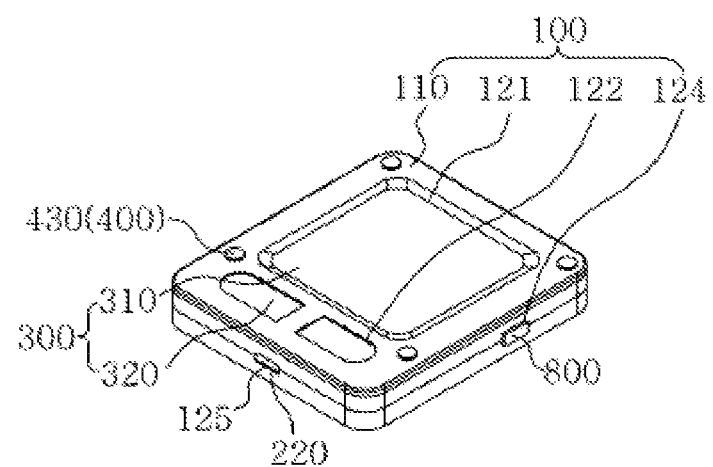
FIG. 11 is a perspective view showing a touch pad device according to a fourth embodiment of the present invention.
Figure 12:
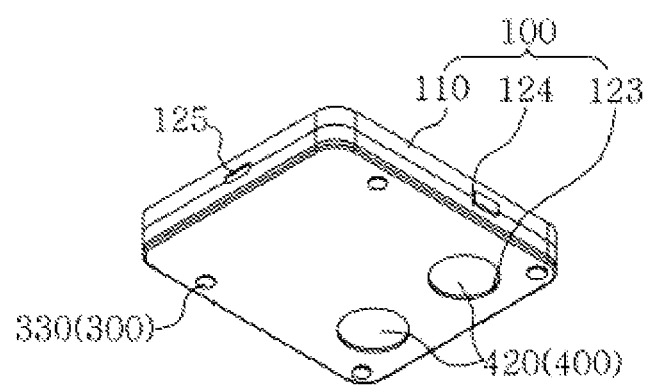
FIG. 12 is a perspective view showing the touch pad device that has been turned over in accordance with the fourth embodiment of the present invention.
Figure 13:
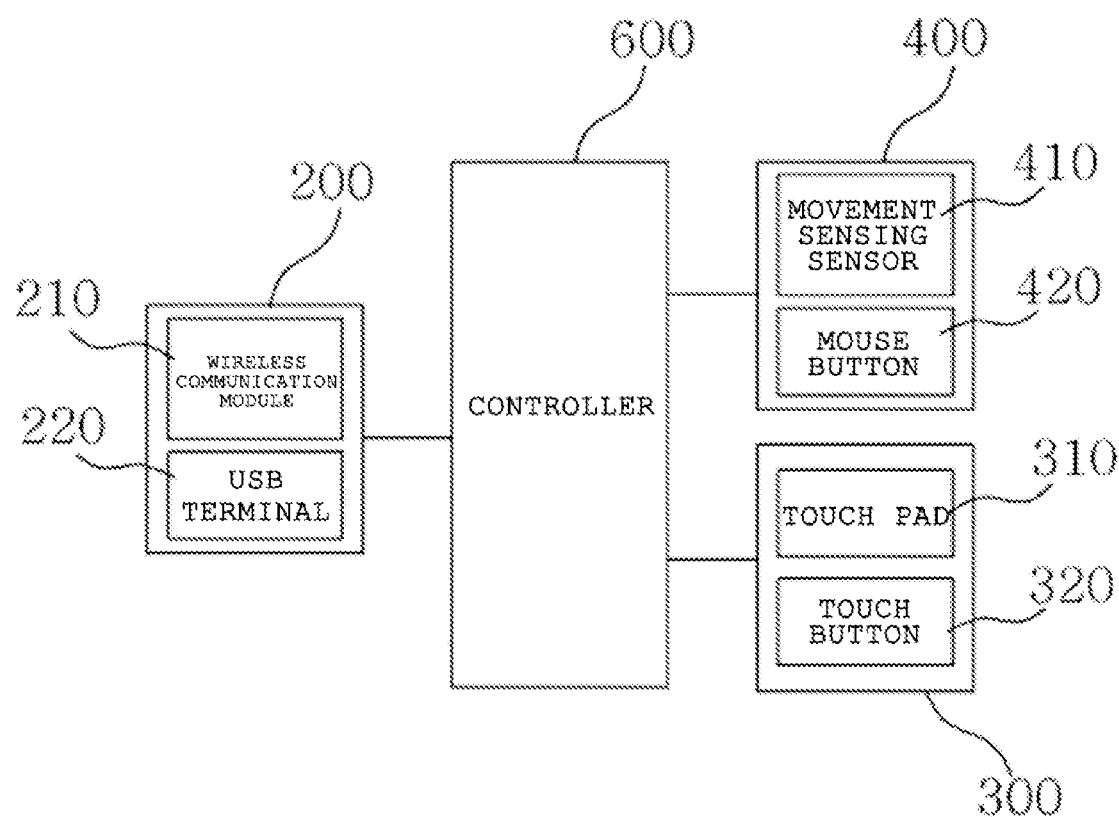
FIG. 13 is a block diagram showing the main configuration of the touch pad device according to the fourth embodiment of the present invention.
Figure 14:
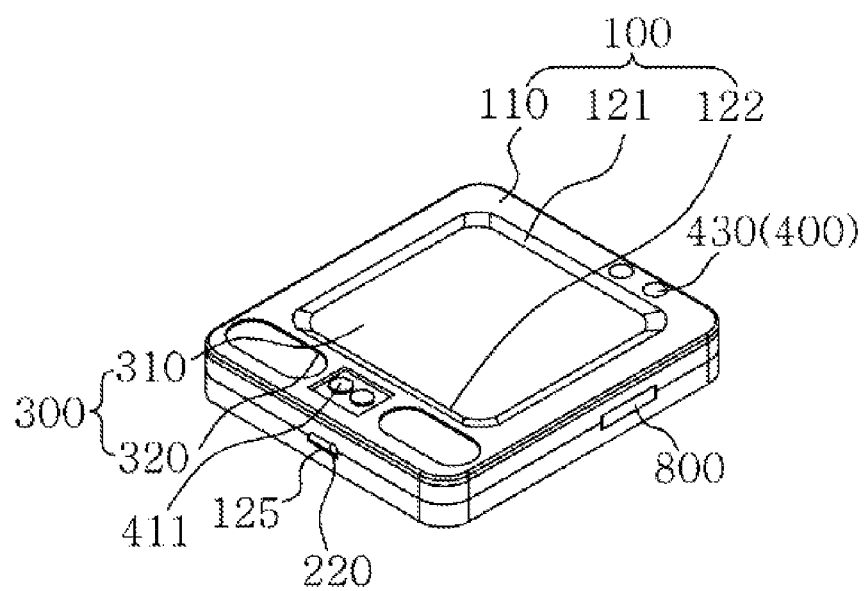
FIG. 14 is a perspective view showing a touch pad device according to a modification of the fourth embodiment of the present invention.

FIG. 11 is a perspective view of a touch pad device according to a fourth embodiment of the present invention, FIG. 12 is a perspective view showing the touch pad device that has been turned over in accordance with the fourth embodiment of the present invention, FIG. 13 is a block diagram showing the main configuration of the touch pad device according to the fourth embodiment of the present invention, and FIG. 14 is a perspective view showing a touch pad device according to a modification of the fourth embodiment of the present invention.

As shown in FIGS. 11 to 13, a touch pad device 10 according to a fourth embodiment of the present invention may include a main body unit 100, a transceiver unit 200, a touch pad unit 300, a mouse unit 400, and a controller 600.

In detail, the main body unit 100 may be provided in a housing shape that a user can hold by hand. In this embodiment, the main body unit 100 may be configured as a flat hexahedron-shaped case 110. However, the main body unit 100 is not limited thereto and, obviously, may be changed in various shapes that a user can conveniently hold by hand.

A pad groove 121 in which a touch pad 310 of the touch pad unit 300 is positioned and a pair of touch grooves 122 exposing a touch button 320 may be formed on one surface (e.g., the top surface) of the main body unit 100. Further, on one surface of the main body unit 100, a plurality of slip tabs 430 may be disposed and spaced apart from each other close to an edge of the main body unit 100.

A plurality of mouse grooves 123 in which mouse buttons 420 of the mouse unit 400 are positioned may be formed on the other surface (e.g., the bottom surface) of the main body unit 100, and a plurality of non-slip tabs 330 may be disposed and spaced part from each other close to an edge of the main body unit 100.

Further, a terminal groove 125 in which a USB terminal 220 is installed may be formed on the bottom surface of the main body unit 100. A switch groove 124 that exposes a switch 800 may be formed on the right side surface of the main body unit 100. In this configuration, the switch 800 can apply an on/off signal or a specific instruction signal for the touch pad device to the controller 600 in response to a push of a user.

The touch pad unit 300 can recognize a touch generated by contact of a user and can transmit a recognized touch signal to the controller 600 when one surface (top surface) of the main body unit 100 is positioned upward.

The touch pad unit 300 includes a touch pad 310, and may include the touch button 320 and the non-slip tabs 330 depending on cases. The touch pad 310 may be mounted on the main body unit 100 to be exposed on one surface of the main body unit 100. In more detail, the touch pad 310 may be positioned in a pad groove 121 of the main body unit 100.

The touch pad 310 can output a touch signal by sensing a touch by a finger or a touch pen. In this embodiment, although the touch pad 310 is implemented with an electrostatic touch pattern on one outer surface of a PCB, it is not limited thereto and various touch sensor elements may be used. For example, a resistive type touch sensor element may be applied to the touch pad.

The touch button 320 may be positioned on one surface of the main body unit 100, in more detail, in the touch grooves 122 of the main body unit 100. The touch button 320 can apply an execution signal recognized by a push of a user's finger to the controller 600. For example, when a user touches the touch pad 310, a pointer is generated on a monitor, and when the user pushes the touch button 320 with the pointer positioned on an icon on the monitor, the touch button 320 can execute a program (instruction) related to the icon through the controller 600.

The non-slip tabs 330 are made of a material having large friction resistance and protrude from the other surface of the main body unit 100, thereby being able to prevent movement of the main body unit 100 during work using the touch pad 310. The non-slip tabs 330 may be made of a rubber material to prevent slip of the main body unit 100 on the supporting surface.

The non-slip tabs 330 may be provided as a plurality of pieces spaced apart from each other close to an edge of the main body unit 100. Although the non-slip tabs 330 are configured as four circular members disposed and spaced apart from each other close to an edge of the main body unit 100 in this embodiment, the number, arrangement type, and shape of the non-slip tabs 330 may be changed in various ways depending on the design environment.

When the main body unit 100 is turned over with the other surface (bottom surface) of the main body unit 100 facing up, the mouse unit 400 can recognize an operation signal generated by the movement of the main body unit 100 and can apply the recognized operation signal to the controller 600.

To this end, the mouse unit 400 may include a movement sensing sensor 410 that senses an operation signal of the main body unit 100 when the main body unit 100 is moved, a mouse button 420 through which an execution signal is input by a push of a user, and a slip tab 430 that induces slip of the main body unit 100 when the main body unit 100 is moved.

The movement sensing sensor 410 can sense movement of the main body unit 100 with the other surface of the main body unit 100 exposed. The movement sensing sensor 410 may be configured as a 3D sensor (e.g., a gyroscope sensor) that is applied to air mouses. Obviously, the movement sensing sensor 410 may be configured, other than a 3D sensor, as an optical sensor 411 that senses movement of the main body unit 100 by recognizing light reflected from a supporting surface, as shown in FIG. 4, or a laser sensor that senses movement of the main body unit 100 by recognizing an infrared laser reflected by a supporting surface. The position of the optical sensor can be changed in accordance with the design.

The mouse button 420 may be positioned on the other surface of the main body unit 100, in more detail, in the mouse groove 123 of the main body unit 100. The mouse button 420 can apply an execution signal recognized by a push of a user's finger to the controller 600. For example, when the mouse unit 400 is activated and a pointer is correspondingly generated on a monitor, a user can push the mouse button 420 with the pointer positioned on an icon on the monitor, and in this case, the mouse button 420 can execute a program (instruction) related to the icon through the controller 600. Further, the mouse button 420 may include a physical button that can perform a click or a double click or a virtual button that uses a touch pad or an acceleration sensor.

The slip tab 430 may be made of a material having small friction resistance and may protrude from one surface of the main body unit 100 to maintain smooth movement of the main body unit 100 during work using the mouse function of the main body unit 100. The slip tab 430 may be provided as a plurality of pieces spaced apart from each other close to an edge of the main body unit 100.

The controller 600 can perform a function that generally controls the operations of all components of the touch pad unit 300 and the mouse unit 400. The controller 600 can receive a touch signal or an operation signal from the touch pad unit 300 and the mouse unit 400. The controller 600 first determines whether it is a mouse mode or a touch pad mode from the received touch signal or operation signal. Second, it can extract movement information (a movement position, a movement distance, a movement direction, etc. of the pointer) intended by a user on a monitor. And third, it can extract action information or property information such as button click in addition to extracting position information.

Further, the controller 600 can provide the extracted information to a computer or a mobile communication device through the transceiver unit 200.

For example, in a state where one surface of the main body unit 100 is exposed (see FIG. 11), when a user touches the touch pad 310 of the touch pad unit 300 with a finger or a touch pen, the controller 600 can activate the function of the touch pad unit 300 and generate a pointer on the monitor of a device in accordance with a predetermined program. Further, when the user moves while being in contact with the touch pad 310, the controller 600 can move the pointer on the monitor. When the user selects a specific icon on the monitor and pushes the touch button 320, the controller 600 can execute a program (instruction) related to the icon (mouse mode).

When a user touches short once (clicks) or continuously touches short twice (double clicks) the touch pad 310, the controller 600 can control the touch pad device 10 to perform the same functions as click and double click functions of a mouse. Further, in a state where the other side of the main body unit 100 is exposed dur to the main body unit being turned over (see FIG. 12), when a user moves the main body unit 100, the controller 600 can activate the function of the mouse unit 400 and create a pointer on the monitor in accordance with a predetermined program. Further, when the user moves the main body unit 100 while holding it, the controller 600 can move the pointer on the monitor. When the user selects a specific icon on the monitor and pushes the mouse button 420, the controller 600 can execute a program (instruction) related to the icon. That is, the function of the pointing device as a common mouse is performed.

The transceiver unit 200 can receive movement information from the controller 600 and transmit the movement information to a mobile communication device, and can receive data from a mobile communication device and transmit the data to the controller 600.

To this end, the transceiver unit 200 may include a wireless communication module 210 that can transmit/receive information to/from a mobile communication device in a wireless type. The wireless communication module 210 is a non-contact type wireless communication module that can exchange data using Bluetooth and can transmit/receive information to/from a mobile communication device such as a computer or a notebook.

Further, the wireless communication module 210 can be used as a pointing device of a smartphone by linking with the smartphone. Further, when a text message, an alarm, or a call are received from the smartphone, it is possible to perform a function that informs a user who is working with a computer of them using vibration or blinking of an LED in the smart touch pad device.

Further, the smart touch pad device intuitionally and visually informs a user that the smartphone has an alarm or notice function by showing different mouse cursor in accordance with the kinds of notices on a monitor in link, thereby being able to prevent a mistake of missing an important call, text, or alarm.

The transceiver unit 200 may include a USB terminal 220 that enables transmission/reception of information to/from a mobile communication device through a wire. The USB terminal 220 may be disposed in the terminal groove 125 of the main body unit 100 and can exchange information with a mobile communication device in a wire type through a transmission cable. Further, it is possible to charge the battery of the smart touch pad device using the USB terminal 220.

Although the configuration of exchanging information with a mobile communication device through the wireless communication module 210 or the USB terminal 220 was described in the present embodiment, various kinds of communication modules other than the wireless communication module 210 or the USB terminal 220 may be used for the transceiver unit 200. For example, the transceiver unit 200 may include a communication module that supports a wireless communication type such as ultrasonic communication.

On the other hand, though not shown, the touch pad device 10 according to the present embodiment may further include a notification unit that informs a user of occurrence of an event using one or more of a lamp, a display, and vibration when one or more events of an alarm of an external mobile communication device, call reception, text reception, and SNS message reception occur in cooperation with the mobile communication device.

Figure 15:
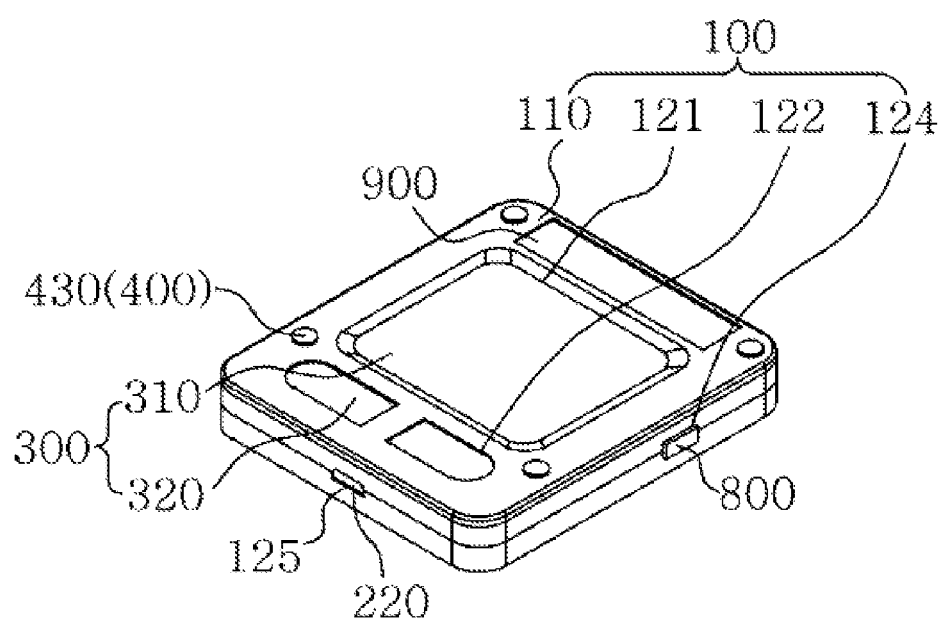
FIG. 15 is a perspective view showing a touch pad device according to a fifth embodiment of the present invention.

FIG. 15 is a perspective view showing a touch pad device according to a fifth embodiment of the present invention.

As shown in FIG. 15, a touch pad device 10 according to a fifth embodiment of the present invention may include a main body unit 100, a transceiver unit 200, a touch pad unit 300, a mouse unit 400, a controller 600, and a display unit 900.

In this configuration, other components except for the display unit 900, for example, the main body unit 100, the transceiver unit 200, the touch pad unit 300, the mouse unit 400, and the controller 600 correspond to the main body unit 100, the transceiver unit 200, the touch pad unit 300, the mouse unit 400, and the controller 600 described in the fourth embodiment, so they are not described in detail.

The display unit 900 may include a display device for displaying characters, pictures, figures, etc. on the main body unit 100. For example, a liquid crystal display, an organic light emitting display, or a plasma display panel may be used as the display unit 900. Obviously, the present invention is not limited thereto and various display devices that can display characters or figures may be used as the display unit 900. The display unit 900 can display current operation mode and can display the kind and property information of information about various alarm functions from a smartphone. For example, it is possible to display text message information and caller information.

Figure 16:
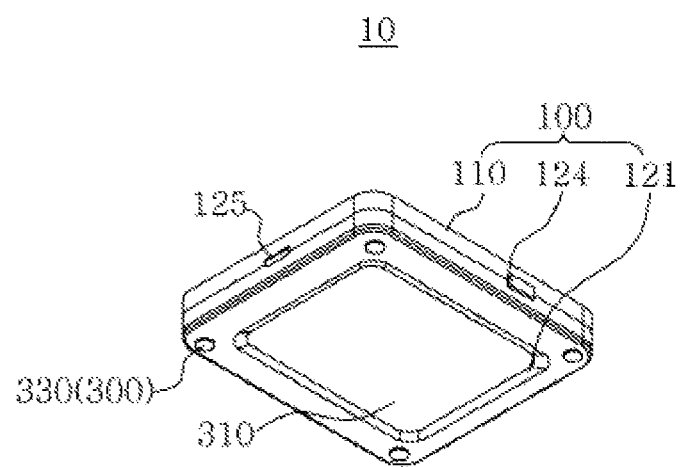
FIG. 16 is a perspective view showing an example for implementing a mouse button function through a touch pad in accordance with a sixth embodiment of the present invention.

FIG. 16 is a perspective view showing an example for implementing a mouse button function through a touch pad in accordance with a sixth embodiment of the present invention.

As shown in FIG. 16, if a touch pad is mounted on the other surface instead of a physical mouse button in the touch pad device 10 according to the present invention, when the smart touch pad device is turned over and operated in a mouse mode and a user touches once short or continuously touches twice short (double touches) the touch pad, the controller 600 can control the touch pad device 10 to perform the same functions as the click and double click functions of a mouse.

Even when the smart touch pad device 10 is turned over and the opposite surface of the touch pad 310 is exposed, the smart touch pad device 10 supports a wheel function while it is used for a mouse function. When it is turned over, a user brings the upper edge in close contact with a plane and lifts the lower end for scroll-up, and brings the lower edge in close contact with the plane and lifts the upper end for scroll-down, in which the amount of scroll may be determined by the inclination. This operation can be measured using an acceleration sensor and/or gyro sensor. A mouse button may be used to support a scroll wheel function. It is possible to show more clearly the scroll function by pressing the button of a mouse and inclining it up or down.

Further, it is possible to implement the scroll function in detail using a mouse button. If, as stated above, when the device is inclined up or down and two mouse buttons are simultaneously pressed, it is possible to move to the first position (if the lower end is lifted) or move to the last position (if the upper end is lifted). The same function can be performed when the device is inclined with two buttons of the mouse pressed. If the right mouse button is pressed with the device inclined up or down, it is possible to perform the function of scrolling one screen (page-up or page-down). The same effect can be achieved even by pressing the right mouse button and inclining the device up or down.

Similarly, by inclining the device left and right and then using a button, all the scroll functions of inclining the device up and down stated above can be implemented. However, they are all the same except for scrolling left and right, so description is omitted.

The mouse wheel function can be implemented in two methods in a normal state. First, when a user holds the device (i.e., when capacitance is measured), touches a touch pad surface with a finger, and moves in a direction to scroll, it is recognized as a scroll wheel function. In this case, the scroll speed may depend on the touch movement speed. In this case, the scroll function may depend on the number and positions of touched fingers. For example, when it a multi-touch using two fingers, it may mean moving one page at a time. Alternatively, when a finger is moved upward from the upper end of the touch pad, it is possible to move to the first or the uppermost position. In the same way, it is possible to move to the uppermost, the lowermost, the left, and the right ends by moving a touch in each direction from up, down, left, right positions of the touch pad.

The touch pad device 10 according to the present invention can use both of a physical button and a touch pad. Accordingly, the other surface is structurally similar to one surface in FIG. 1, and there is an advantage in that both surfaces can be used as the touch pad 310.

Figure 17A:
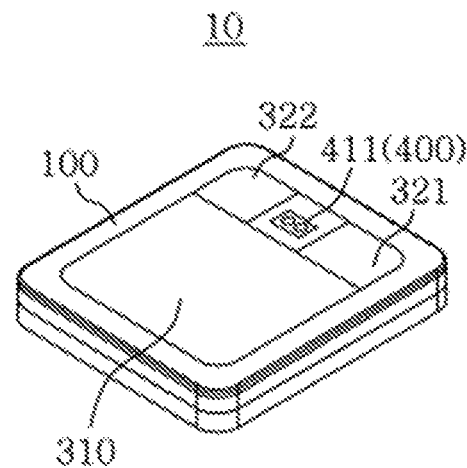
FIGS. 17(a) and 17(b) are perspective views showing a touch pad device according to a seventh embodiment of the present invention.
Figure 17B:
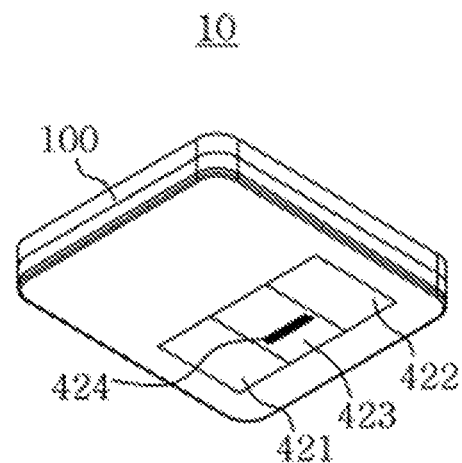

FIG. 17 is a perspective view showing a touch pad device according to a seventh embodiment of the present invention. Parts that are not shown in this figure are the components the same as or similar to those of the previous embodiments and repeated components and reference numerals are omitted. In FIG. 17, (a) shows the front surface of the touch pad device 10 and (b) shows the rear surface of the touch pad device 10.

A touch pad unit 300 may be disposed on the front surface of the touch pad device 10. The touch pad unit 300 may include a touch pad 310 that recognizes a touch signal generated by contact of a user.

A pair of touch buttons 321 and 322 may be disposed at an end of the touch pad 310. A movement sensing sensor 410 may be disposed between the pair of touch buttons 321 and 322.

The movement sensing sensor 410 may be an optical sensor 411. In the touch pad mode, the optical sensor can perform a trackball function that senses contact and movement of user's fingers, whereby precise position control is possible by assisting the touch pad 310. Further, the movement sensing sensor 410 may be other various sensors as long as they have the function described above. For example, the movement sensing sensor 410 may be an ultrasonic sensor.

A pair of mouse buttons 421 and 422 through which an execution signal is input by a push of a user may be disposed on the other surface of the main body unit 100. The wheel button 423 is disposed between the pair of mouse buttons 421 and 422 and can sense a swipe by a user.

The pair of mouse buttons 421 and 422 can correspond to the left button and the right button of a mouse, respectively.

A step 424 may be formed at the center of the wheel button 423, so when a user swipes the step 424 up and down, it can be considered as a wheel function.

When the mouse mode is entered by a user turning over a mouse or coming in contact with an electrode in a horizontal state, the touch pad 310 can be deactivated. In the mouse mode, the mouse buttons 421 and 422 and the wheel button 423 on the other surface (rear surface) and the movement sensing sensor 410 on one surface (front surface) are activated, so the touch pad device 10 can function as a mouse.

Figure 18:
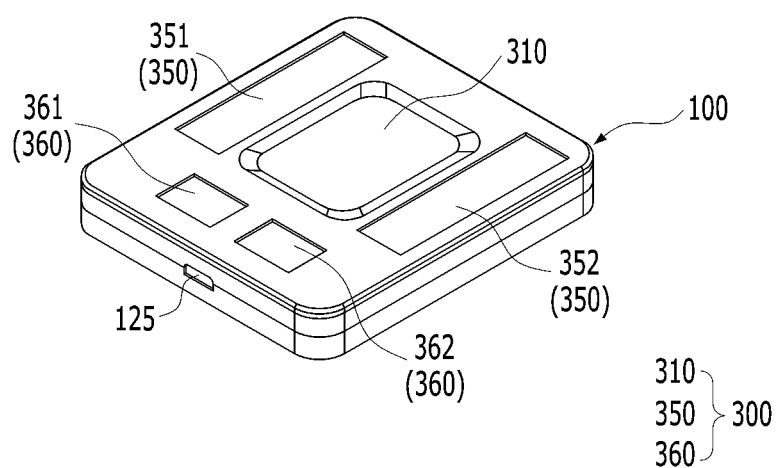
FIG. 18 is a perspective view showing a touch pad device according to an eighth embodiment of the present invention.

Referring to FIG. 18, the touch pad unit 300 may include the touch pad 310. The touch pad 310 may be positioned on the top surface of the main body unit 100. The touch pad 310 can sense touch by a user. For example, the touch pad 310 can acquire touch input by a user.

The touch pad unit 300 may include a first touch region 350. The first touch sensing region 350 may be adjacent to the touch pad 310. The first touch sensing region 350 may be positioned on the top surface of the main body unit 100.

The first touch region 350 may be provided in plurality. For example, the first touch region 350 may include a first-side first touch region 351 and a second-side first touch region 352. The first-side first touch region 351 may be adjacent to a first side of the touch pad 310. The second-side first touch region 351 may be adjacent to a second side of the touch pad 310. The second side of the touch pad 310 may be positioned opposite the first side of the touch pad 310. The touch pad 310 may be positioned between the first-side first touch region 351 and the second-side first touch region 352.

The touch pad unit 300 may include a second touch region 360. The second touch region 360 may be positioned on the top surface of the main body unit 100. The second touch region 360 may be provided in plurality. For example, the second touch region 360 may include a first-side second touch region 361 and a second-side second touch region 362.

The first-side second touch region 361 may be adjacent to the first-side first touch region 351 and the touch pad 310. The second-side second touch region 362 may be adjacent to the second-side first touch region 351 and the touch pad 310. The second touch region 360 may be positioned at the lower end of the touch pad 310.

The touch regions 350 and 360 may mean at least one of the first touch region 350 and the second touch region 360. When a predetermined pattern of touch is sensed in the touch regions 350 and 360, a predetermined function can be performed.

For example, when a touch is sensed in all of the first-side first touch region 351, the second-side first touch region 352, the first-side second touch region 361, and the second-side second touch region 362, the touch pad device 10 can support a mouse function.

For example, when a touch is sensed only in the first-side first touch region 351 and the second-side first touch region 352, the touch pad device 10 can provide the touch pad function.

For example, when a touch is sensed only in the first-side second touch region 361 and the second-side second touch region 362, the touch pad device 10 can change into the touch pad mode.

For example, when a touch is sensed in the second-side second touch region 362 while a touch is maintained in the first-side first touch region 351 and the second-side first touch region 352, the function of a click can be performed.

For example, when two continuous touches are sensed in the second-side second touch region 362 while a touch is maintained in the first-side first touch region 351 and the second-side first touch region 352, the functions of a click and execution can be performed.

For example, when two continuous touches are sensed in the second-side second touch region 362 while a touch is maintained in the first-side first touch region 351 and the second-side first touch region 352, the function of increasing volume or enlarging the screen can be performed.

For example, when two continuous touches are sensed in the second-side second touch region 362 while a touch is maintained in the first-side first touch region 351 and the second-side first touch region 352, the function of decreasing volume or reducing the screen can be performed.

For example, when a touch is maintained in at least one touch region of the first-side first touch region 351, the second-side first touch region 352, the first-side second touch region 361, and the second-side second touch region 362 and a specific pattern of touch is applied to the other touch regions, a function corresponding to the specific pattern can be performed.

The touch pad device 10 can sense rotation. The touch pad device 10 may include a component that senses rotation. For example, the touch pad device 10 may include an IMU (Inertial Measurement Unit). The touch pad device 10 can set different modes depending on sensed rotation. For example, when rotation of 90 degrees to the left is sensed, the touch pad device 10 can change into the touch mode. For example, when rotation of 90 degrees to the right is sensed, the touch pad device 10 can change into the mouse mode. For example, when rotation of 90 degrees to the left is sensed and then left-right shaking is sensed, the touch pad device 10 can change into the touch mode. For example, when rotation of 90 degrees to the right is sensed and then left-right shaking is sensed, the touch pad device 10 can change into the mouse mode.

According to an embodiment of the present invention, since it is possible to selectively use a mouse function and a touch pad function through one device, there is an effect in that it is possible to efficiently perform computing work to be fitted to a task requiring fast work or work requiring fine sensitivity.

Further, according to an embodiment of the present invention, there is an effect in that it is possible to control various devices using touch gesture recognition.

Further, according to an embodiment of the present invention, there is an effect in that it is possible to replace various kinds of input devices with one touch pad device using various sensing functions.

Further, according to an embodiment of the present invention, there is an effect in that it is possible to prevent a mistake of missing an important call, text, or alarm by making a user more clearly recognize call reception, and a text or an SNS alarm that can be easily missed due to absorption in computer work.

The effects of the present invention are not limited thereto and it should be understood that the effects include all effects that can be inferred from the configuration of the present invention described in the following specification or claims.

The above description is provided as an exemplary embodiment of the present invention and it should be understood that the present invention may be easily modified in other various ways without changing the spirit or the necessary features of the present invention by those skilled in the art. Therefore, the embodiments described above are only examples and should not be construed as being limitative in all respects. For example, the components described as single parts may be divided and the components described as separate parts may be integrated.

The scope of the present invention is defined by the following claims, and all of changes and modifications obtained from the meaning and range of claims and equivalent concepts should be construed as being included in the scope of the present invention.

What is claimed is:

1. A smart touch pad device comprising:
a main body;
a touch pad disposed on the main body to input a touch signal generated by contact of a user;
a mouse unit configured to recognize an operation signal generated by movement of the main body;
a controller configured to extract position coordinates or movement information from the touch signal, or determine a use mode by extracting and recognizing touch gesture information for performing a predetermined function from the touch signal; and
a transceiver configured to transmit or receive the position coordinates, the movement information, or the touch gesture information to or from a control target device, a computer, or a mobile communication device,
wherein a mode of the controller changes into a standby mode that performs a predetermined function from a touch gesture signal when receiving the touch gesture signal forming a cross point using two touch lines from the touch pad, and the controller extracts motion information that performs an instruction according to a predetermined function when receiving the touch signal, which is clicked, double clicked, or long-pressed in a region divided by the touch lines, from the touch pad in a state changed to the standby mode.

2. The smart touch pad device of claim 1, wherein the mode of the controller changes into the standby mode when receiving an X-shaped touch gesture signal forming a cross point using two touch lines from the touch pad; and changes into a touch pad mode, a mouse mode, a keypad mode, or a combination mode in which the touch pad mode and the mouse mode can be used in combination and then performs a function according to the touch pad mode, the mouse mode, the keypad mode, or the combination mode set in advance when receiving a touch signal of a click in any one of four regions divided by the touch lines from the touch pad in the state changed to the standby mode.

3. The smart touch pad device of claim 1, wherein the mode of the controller changes into the standby mode when receiving an X-shaped touch gesture signal by forming a cross point using two touch lines from the touch pad; and changes into a remote control mode that controls a remote control function and then performs a function as a remote controller for a surrounding connected device in the remote control mode when receiving a touch signal of a double click in any one of four regions divided by the touch lines from the touch pad in the state changed to the standby mode.

4. The smart touch pad device of claim 3, wherein in the remote control mode, an instruction for turning on the power of the control target device is executed by a touch signal that is clicked, double clicked, or long-pressed at a position of a start point of one touch line after a touch signal forming the touch line is input.

5. The smart touch pad device of claim 3, wherein the motion information of the remote control mode executes an instruction for turning off power of the target device by a touch signal that is clicked, double clicked, or long-pressed at an end point of one touch line after a touch signal forming the touch line is input.

6. A smart touch pad device comprising:
a main body;
a touch pad disposed on the main body to input a touch signal generated by contact of a user;
a mouse unit configured to recognize an operation signal generated by movement of the main body;
a controller configured to extract position coordinates or movement information from the touch signal, or determine a use mode by extracting and recognizing touch gesture information for performing a predetermined function from the touch signal; and
a transceiver configured to transmit or receive the position coordinates, the movement information, or the touch gesture information to or from a control target device, a computer, or a mobile communication device,
wherein the main body includes a first electrode configured to measure capacitance generated at one side of the main body and a second electrode configured to measure capacitance generated at another side of the main body, and
wherein the controller is configured to activate operation of the mouse unit when capacitance is sensed between the first electrode and the second electrode.

7. A smart touch pad device comprising:
a main body;
a touch pad disposed on the main body to input a touch signal generated by contact of a user;
a mouse unit configured to recognize an operation signal generated by movement of the main body;
a controller configured to extract position coordinates or movement information from the touch signal, or determine a use mode by extracting and recognizing touch gesture information for performing a predetermined function from the touch signal; and
a transceiver configured to transmit or receive the position coordinates, the movement information, or the touch gesture information to or from a control target device, a computer, or a mobile communication device,
wherein the smart touch pad further comprises a horizontal sensor that is configured to sense whether the main body is being moved horizontally with respect to a supporting surface, and
wherein the controller is configured to receive sensing information about a horizontal movement state of the main body from the horizontal sensor, and extract movement information by recognizing an operation signal input by movement of the main body and extract a touch pad contact position as property information when the main body is in a horizontal movement state and at least one or more points are in contact with the touch pad by the user.

8. The smart touch pad device of claim 2, wherein the mode of the controller changes into the mouse mode and the touch pad mode by recognizing rotational operation signals of the main body.

9. The smart touch pad device of claim 6, wherein the controller is configured to recognize that it is a scroll wheel function when a touch scroll operation is sensed on the touch pad.

10. The smart touch pad device of claim 1, wherein the touch pad unit includes:
a touch pad is disposed on one surface of the main body unit such that a touch signal is input by contact of a user;

a pair of mouse buttons positioned at an end of the touch pad and disposed on one surface of the main body such that an execution signal is input by a push of the user; and a wheel button positioned between the pair of mouse buttons for sensing a swipe of the user.

11. A smart touch pad device comprising:

a main body;

a touch pad configured to recognize a touch signal generated by contact of a user with a first surface of the main body exposed;

a mouse unit configured to recognize an operation signal generated by movement of the main body in a state where the main body is turned over and a second surface of the main body is exposed;

a controller configured to extract a position and movement information from the touch signal or the operation signal; and a transceiver configured to transmit or receive the movement information to or from a computer or a mobile communication device, wherein the mouse unit includes a mouse button disposed on the second surface of the main body such that an execution signal is input to the second surface by a push of the user.

12. The smart touch pad device of claim 11, wherein the mouse unit includes a second touch pad disposed on the second surface of the main body to perform a mouse button function by a touch signal generated by contact of the user.

13. The smart touch pad device of claim 11, wherein the mouse unit is configured to calculate position movement and coordinates using an optical sensor or an ultrasonic sensor to sense movement, and the optical sensor or the ultrasonic sensor can perform a trackball function in a touch pad mode.

14. The smart touch pad device of claim 11, wherein the controller is configured to recognize turnover of the device to select a mouse function and a touch pad function and automatically changes into a mouse mode or a touch pad mode.

15. The smart touch pad device of claim 11, wherein the controller is configured to perform a scroll wheel function of a mouse function using inclination of the device, a mouse button, or a combination thereof.

16. The smart touch pad device of claim 11, wherein the touch pad further includes a non-slip tab protruding from the second surface of the main body to prevent movement of the main body.

17. The smart touch pad device of claim 16, wherein the mouse unit further includes a slip tab protruding from the first surface of the main body to make movement of the main body smooth.

18. The smart touch pad device of claim 11, further comprising a notification unit configured to inform a user of occurrence of an event using one or more of a lamp, a display, and vibration when one or more events of an alarm of the mobile communication device, call reception, text reception, and SNS message reception occur by linking with the mobile communication device.

* * * * *